FIG. I

INVENTOR.
ROGER LELAND HALL
BY
ATTORNEY

Sept. 27, 1966  R. L. HALL  3,275,747
ELECTRONIC PLOTTER UTILIZING STORAGE TUBES
Filed May 21, 1963  8 Sheets-Sheet 8

INVENTOR.
ROGER LELAND HALL
BY
ATTORNEY

United States Patent Office 3,275,747
Patented Sept. 27, 1966

3,275,747
ELECTRONIC PLOTTER UTILIZING
STORAGE TUBES
Roger Leland Hall, Francestown, N.H., assignor to
Sanders Associates, Inc., Nashua, N.H., a corporation
of Delaware
Filed May 21, 1963, Ser. No. 281,993
7 Claims. (Cl. 178—6.8)

The invention relates to an electronic system for storing and displaying information and more particularly pertains to an electronic system in which information may be stored for long periods or be available for display immediately while being retained in the store.

The invention concerns an electronic display system in which information is written into a storage device and the stored information is displayed on a monitor. One or a plurality of storage devices may be employed and where more than one storage device is used, the information in each store can be simultaneously but separately displayed on a different part of the monitor. Both the storage device and the monitor are cathode ray tubes and the system is arranged to provide a synchronous relation between the sweeps of the electron beams in the two tubes.

The system is arranged to accept electrical signals in digital form, the signals representing X and Y co-ordinates and symbols. The digital signals are converted to analog voltage form and the analog signals cause the electron beam of the storage tube to be positioned at a point, corresponding to the X and Y coordinates, on a dielectric storage surface in the tube. The electron beam then is caused to "write" on the surface at that point. The information recorded in the storage tube may be displayed continuously on the monitor while the information accumulates or that information can be caused to accumulate in the storage tube while the monitor is displaying information from other sources. Where the stored information is continuously displayed on the monitor, the rate at which information can accumulate is somewhat reduced because information is "written" in to the storage tube only during the retrace time of the cathode ray monitor tube. Where the information being accumulated is not immediately displayed on the monitor, information can be "written" into the storage tube at a much more rapid rate.

The arrangement of the invention and its mode of operation can be better understood from a perusal of the following exposition when considered in conjunction with the accompanying drawings in which:

FIG. 1 is a schematic arrangement of a rudimentary form of the invention;

FIG. 2 schematically illustrates the arrangement of the invention in greater detail;

Figure 1:
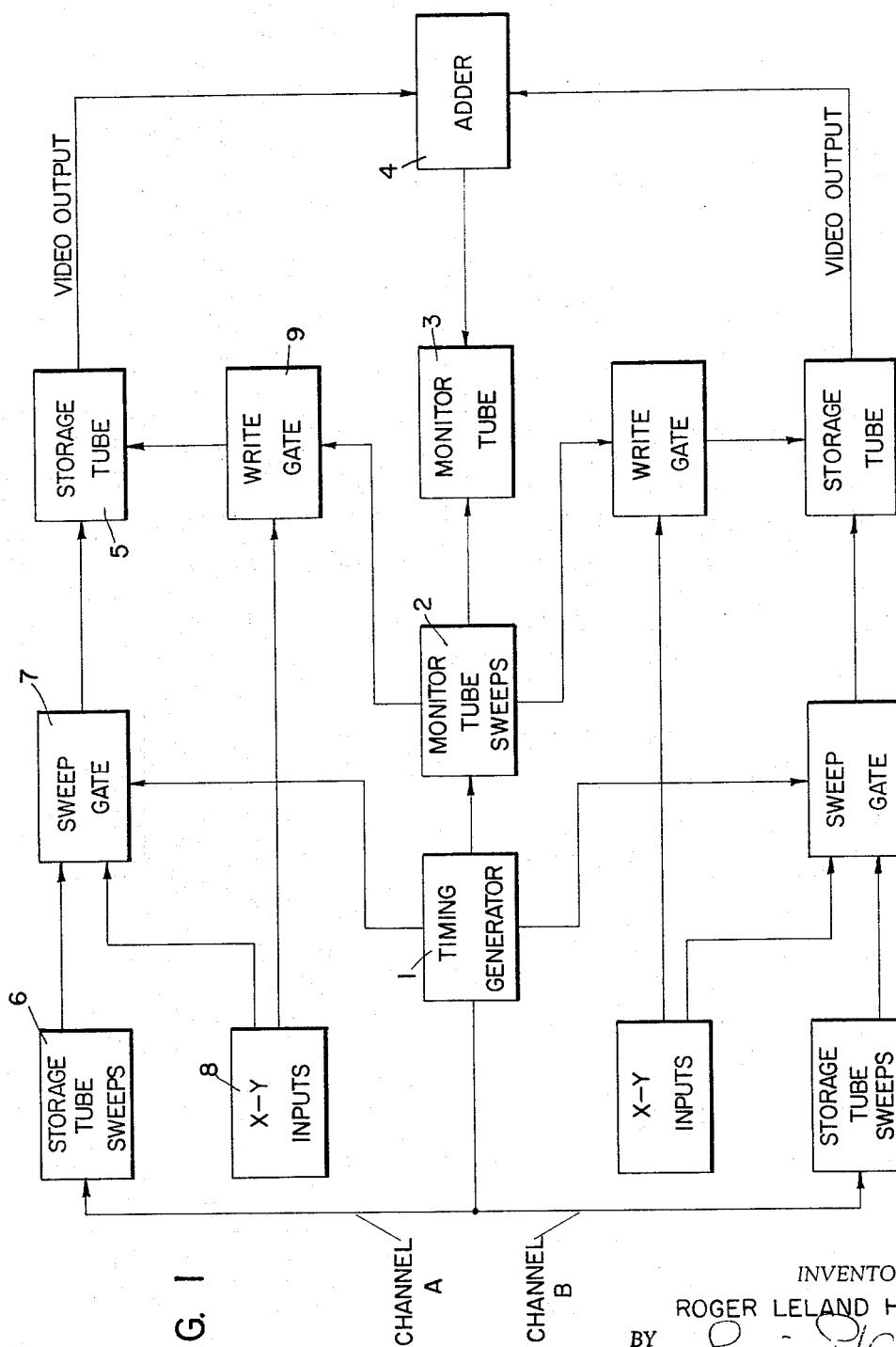

The general scheme of the invention, which has been greatly simplified for expository purposes, is shown in FIG. 1. Two information storage channels, A and B, are indicated in the system of FIG. 1. Timing generator 1 provides timing signals to both storage channels and to the monitor tube sweeps 2 which control the manner in which the monitor tube 3 is scanned by its electron beam. Video information read out from each of the storage channels can be applied to the monitor tube through an adder 4. While but two information storage channels are shown, the number of channels may be increased.

Only information channel A is here described since all the information channels can be identical. Channel A employs a storage tube 5 of the type having a dielectric storage surface which is scanned by an electron beam. Information recorded on the storage surface is "read out" of the tube in the form of electrical signals by causing the electron beam to scan the storage surface. Storage tube sweeps 6 provide the deflection signals for the electron beam during "read out." Timing generator 1 permits sweep gates 7 to pass the deflection signals to the storage tube during the time of "read out."

Information input device 8 furnishes X–Y deflection signals to sweep gates 7. Gates 7 are arranged to pass the X–Y signals only during the retrace period of monitor tube 3 if the information in the storage tube is being displayed on the monitor. Where the stored information is not being displayed on the monitor, sweep gates 7 are continuously enabled to pass the X–Y signals. Information input device 8 also provides a signal to write gate 9 and when that gate is enabled by timing generator 1, information can be recorded on the storage surface of tube 5.

Timing generator 1 causes monitor tube sweeps 2 to deflect the beam in monitor tube 3 so that the beam scans in a repetitive pattern. Storage tube sweeps 6 cause the beam in storage tube 5, during read out, to scan in the same repetitive pattern as in the monitor tube. Timing generator 1 provides signals to the monitor tube sweeps 2 and the storage tube sweeps 6 causing the monitor tube and the storage tube to be scanned in synchronism.

Assuming that the monitor tube is scanned in the manner of a television tube (that is, the beam is rapidly swept from side to side while being slowly swept from top to bottom), the storage tube is scanned in the same manner. Line to line synchronism is maintained between the sweeps by having the storage and monitor tube sweeps triggered by timing pulses from timing generator 1. The monitor tube sweeps are arranged so that the monitor tube is swept in an invariant manner whereas the storage tube sweeps are arranged so that the commencement of the vertical or horizontal sweep or both can be delayed relative to the corresponding vertical and horizontal sweep in the monitor. The speed at which the beam in the storage tube is caused to sweep the storage surface can also be adjusted.

The storage tube sweeps can be set to have the sweep of each horizontal line commence and end with the corresponding horizontal sweep in the monitor. If the vertical sweep in the storage tube is also set to commence and end with the vertical sweep of the monitor, the information read out of the storage tube covers the entire viewing area of the monitor tube.

Where it is desired to have the information in storage tube 5 appear on the upper right quadrant of the monitor, the start of the horizontal sweep in the storage tube is commenced at the time the horizontal sweep in the monior is halfway across the tube (assuming the horizontal sweep is from left to right) and the speed of the horizontal sweep in the storage tube is set to finish with the corresponding horizontal sweep in the monitor. The vertical sweep in the storage tube is set to commence with the vertical sweep in the monitor but the speed of the vertical sweep in the storage tube is set to cause that sweep to be completed at the time the beam in the monitor has been swept down to the middle of the tube. The beam in the monitor continues to sweep down but video information from storage tube 5 is now blanked out by a signal from the timing generator until the commencement of the next monitor vertical sweep.

Through controlling the storage tube sweeps, information in storage tube 5 can be caused to occupy the entire viewing area of the monitor or can be caused to occupy only a part of the viewing area. For example, where the stored information of tube 5 is made to occupy a quadrant of the monitor, stored information from the storage tube in channel B can be caused to occupy a different quadrant and the remaining two quadrants may be used to display information from other channels.

Figure 2:
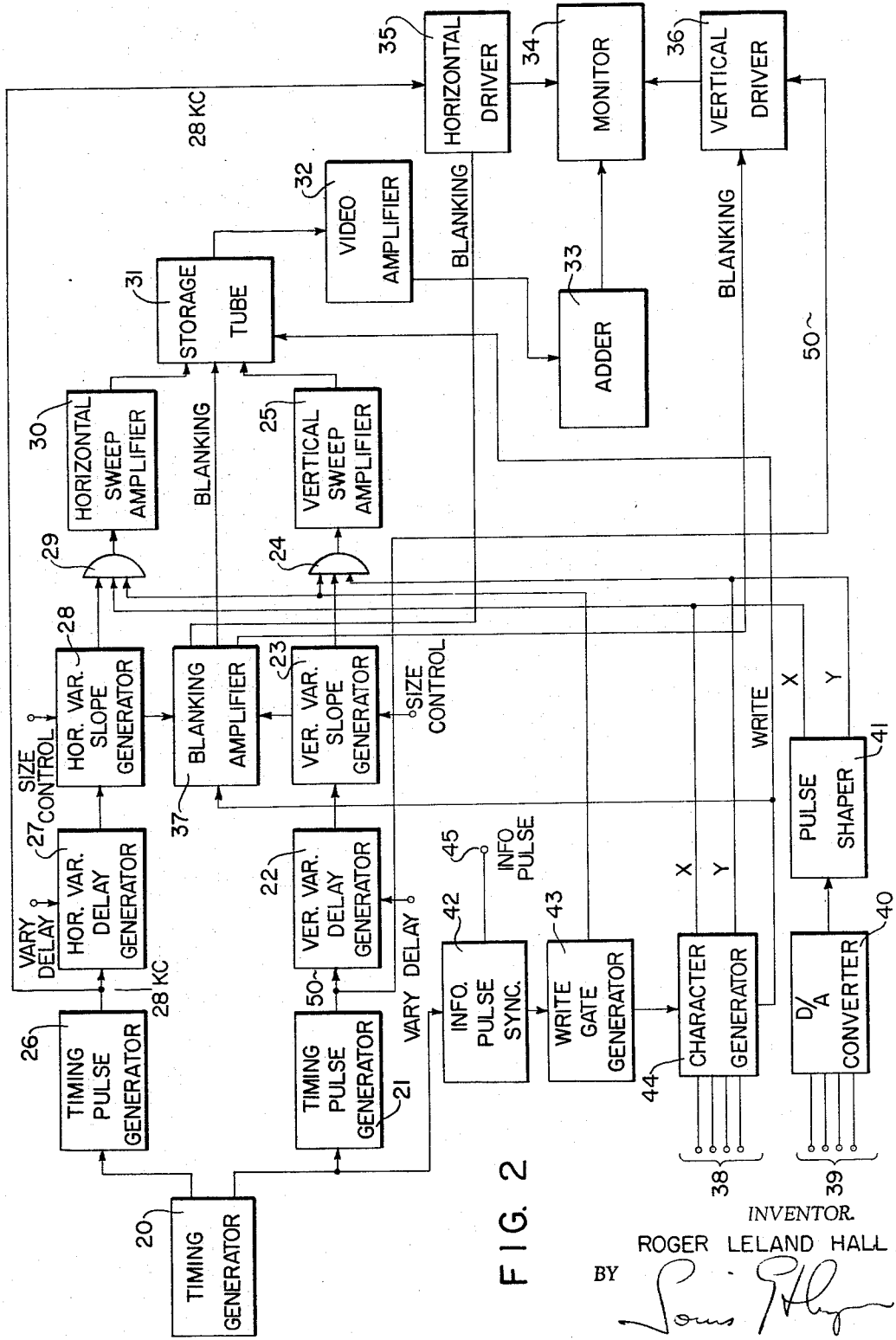

Referring to FIG. 2, the arrangement of the display system is shown in greater detail. A storage tube of the type employing a cathode ray (i.e., beam of electrons) is shown at 31. The storage tube has a fine-mesh metal screen coated with a dielectric substance capable of retaining an electrostatic charge. The electron beam is directed against the dielectric surface and can cause the area impinged upon to be charged either positively or negatively, the polarity of the charge depending upon the potential of the screen relative to the cathode potential. To "write" information upon the storage screen, the storage is maintained at a "write" potential. To "read" information from the storage tube, the potential of the screen is lowered slightly and the screen is scanned by the electron beam. The output signal is obtained from collector electrode in the tube which intercepts the beam passing through the screen.

By approximately setting the potentials applied to electrodes of the storage tube, information recorded on the storage surface can be caused to fade out at a desired rate. Thus new information would appear more brightly on the monitor scope, less recent information would be dimmer, and old information would not be visible. For example, the fade rate of the storage tube may be set to cause information to fade out in five minutes so that all information recorded in the storage tube for more than five minutes would pass away and only recent information would be available from the storage tube. The storage tube, on the other hand, is capable of retaining recorded information over long periods of time and it is feasible, when the storage tube is not used for reading out, to retain information for a period of a month or longer. Because of that capability, information can be recorded in the storage tube and recalled any time within the retention period.

The monitor 34 is a cathode ray tube of the type for presenting information traced out by the electron beam. In the preferred embodiment of the invention, the beam traces out a rectangular raster; that is, the beam is scanned rapidly from side to side while being moved slowly in the vertical direction. Where the "read" beam in the storage tube is scanned in the same manner as the monitor beam and in synchronism therewith, the information in the storage tube appears on the monitor in the same relation that the information has in the storage tube.

Referring to FIG. 2, a timing generator 20 provides signals to pulse generator 21 and pulse generator 26. The timing generator has an oscillator which provides the basic timing frequency and the signals emitted by the timing generator are either sub-multiples or multiples of the basic frequency. The signals from the timing generator cause pulse generator 21 to be triggered at a rate of 50 cycles per second, whereas the pulse generator 26 is triggered at a rate of 28 kilocycles per second.

The timing pulse from generator 26 is applied to horizontal driver 35 and causes that mechanism to emit a signal which sweeps the beam in monitor 34 across the tube. The same timing pulse from generator 26 is applied to the horizontal variable delay generator 27. That latter mechanism can be adjusted to delay the transmission of the pulse from generator 26 to the horizontal slope generator 28. Upon being triggered by the signal emitted from delay mechanism 27, the horizontal slope generator emits a waveform whose maximum amplitude is constant but whose slope is set by the size control. The signal emitted by generator 28 is applied to a gate 29 and if that gate is enabled, the signal passes through the gate to horizontal amplifier 30 where the signal is amplified and is then applied to the beam deflection apparatus of storage tube 31.

Figure 3:
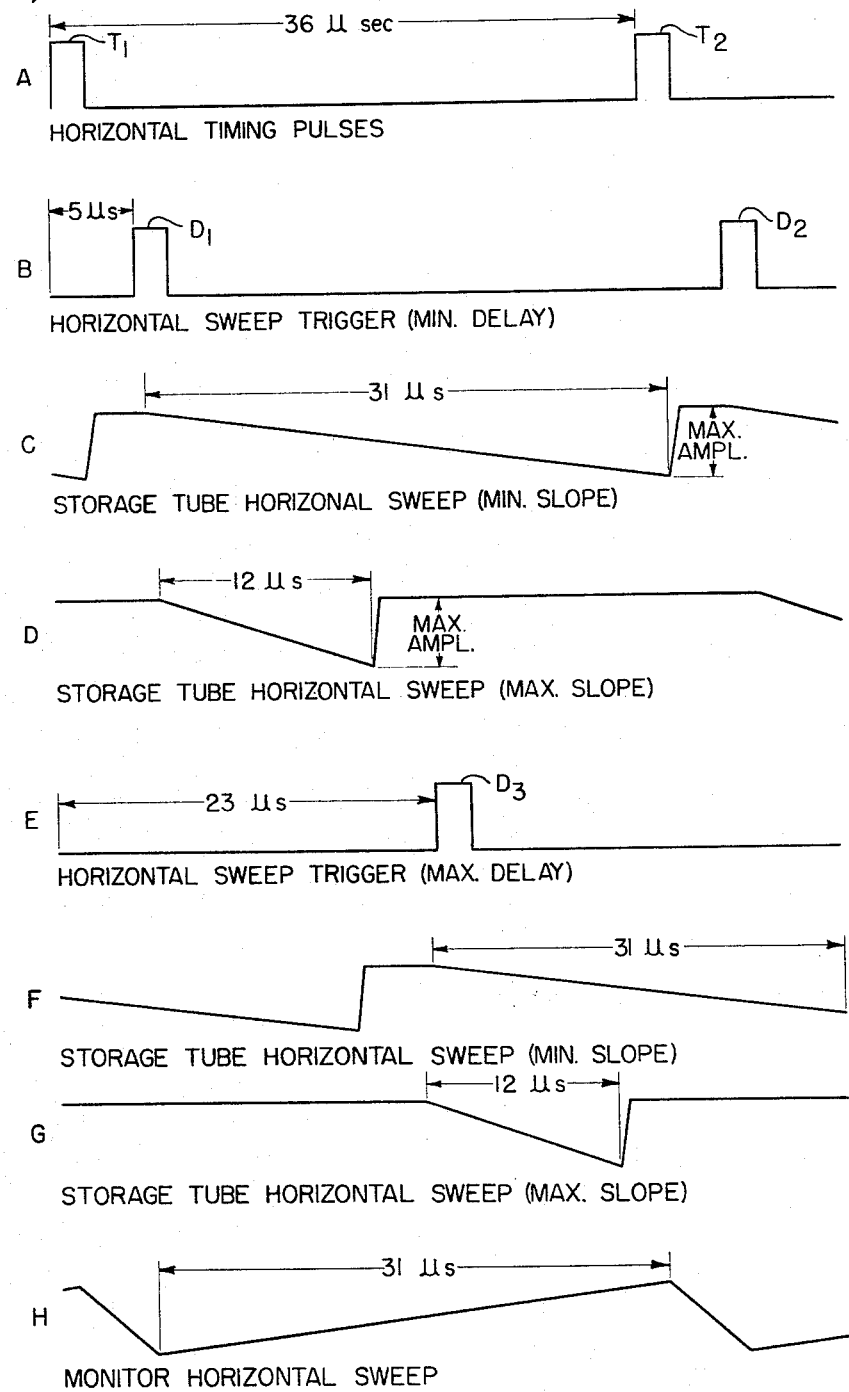
FIG. 3 shows the time relationship of pulses and waveforms occurring in the horizontal sweeps of the arrangement of FIG. 2.

The waveforms of FIG. 3 depict the time relationship of the horizontal sweep in the storage tube and in the monitor. FIG. 3A shows the timing pulses emitted by timing pulse generator 26. Each timing pulse is delayed in delay mechanism 27 by a time which can be varied between a minimum of 5 or 6 $\mu$secs., for example, to a maximum of 23 $\mu$secs., for example. FIG. 3B illustrates the trigger emitted from delay generator 27 with minimum delay. The delayed pulse triggers horizontal slope generator 28 which thereupon emits a waveform whose slope is determined by the size control. FIG. 3C illustrates the waveform emitted by generator 28 when the size control is set for minimum slope. FIG. 3D illustrates the waveform emitted by that generator when the control is set for maximum slope. In FIGS. 3C and 3D, the maximum amplitude of the waveforms are the same, it is only the slope of the wave that is different. The amplitudes of the waveforms of FIGS. 3C and 3D determine the width of the sweep and since those amplitudes are equal, the width of the electron beam sweep in the storage tube is always the same. The slope of the waveform determines the speed at which the electron beam sweeps horizontally across the storage surface of the storage tube.

FIG. 3E indicates the position of the horizontal timing pulse $T_1$ after it has been delayed the maximum time and emerges from delay generator 27 as pulse $D_3$. Where the variable slope generator 28 is set for minimum slope, pulse $D_3$ causes generator 28 to emit the waveform depicted in FIG. 3F. Where the variable slope generator is set for maximum slope, pulse $D_3$ causes generator 28 to emit the waveform depicted in FIG. 3G. In FIGS. 3F and 3G the maximum amplitudes are the same as the maximum amplitudes of the waveforms of FIGS. 3C and 3D.

FIG. 3H shows the horizontal sweep for the monitor tube. Due to delays inherent in the beam deflection circuitry of the monitor, the horizontal sweep does not commence until about 5 $\mu$secs. after pulse $T_1$. Thereafter the horizontal sweep is completed just as the next horizontal timing pulse is emitted by pulse generator 26.

It is assumed, for the sake of having an example, that the horizontal timing pulses of FIG. 3A are emitted at periods of 36 $\mu$secs. Since the start of the monitor's horizontal sweep requires a delay of 5 $\mu$secs. to permit retrace of the beam in the monitor, the horizontal sweep must be completed in 31 $\mu$secs. or less if the beam is to retrace and be ready for the next horizontal sweep at the time of the next horizontal timing pulse $T_2$.

In comparing the waveform of FIG. 3C with the waveform of FIG. 3H, it is apparent that those two waveforms begin and end together. The information read out of the storage tube by the sweep of FIG. 3C is written into the monitor during the sweep of FIG. 3H. Because of the line to line correspondence between the horizontal sweeps of the monitor and storage tube, all the information in the storage tube is caused to be displayed over the entire viewing surface of the monitor.

Where the horizontal slope generator is set for maximum slope, as indicated by the waveform of FIG. 3D or FIG. 3G, the horizontal sweep of the storage tube beam is assumed to be completed in 12 $\mu$secs. It is only during that 12 $\mu$second interval that information is read out from the storage; at other times, video signals from the storage tube are blanked out by a signal from the timing generator.

Video signals read out of storage tube 31 are acted upon by video amplifier 32 and the amplified video signals are applied through adder 33 to the monitor 34. The amplified video signals, in the preferred embodiment of the invention, are employed to intensity modulate the beam in the monitor.

Turning now to the vertical sweep circuits of storage tube 31 and monitor 34, the vertical sweeps of both tubes are governed by the 50 cycle timing pulses emitted by the generator 21. Vertical driver 36 is triggered by each timing pulse from generator 21 and initiates a vertical sweep of the beam in the monitor. The timing pulses from generator 21 are also impressed upon variable delay generator 22. That delay generator, after causing the delay set in by the "vary delay" control, passes each timing pulse to the variable slope generator 23. The output pulse of delay generator 22 triggers slope generator 23 into emitting a vertical sweep waveform. The slope of the vertical sweep waveform is adjusted by means of a size control. The vertical sweep waveform is transmitted through gate 24, assuming that gate to be enabled, and is, after amplification in vertical sweep amplifier 25, applied to the deflection apparatus of storage tube 31.

Figure 4:
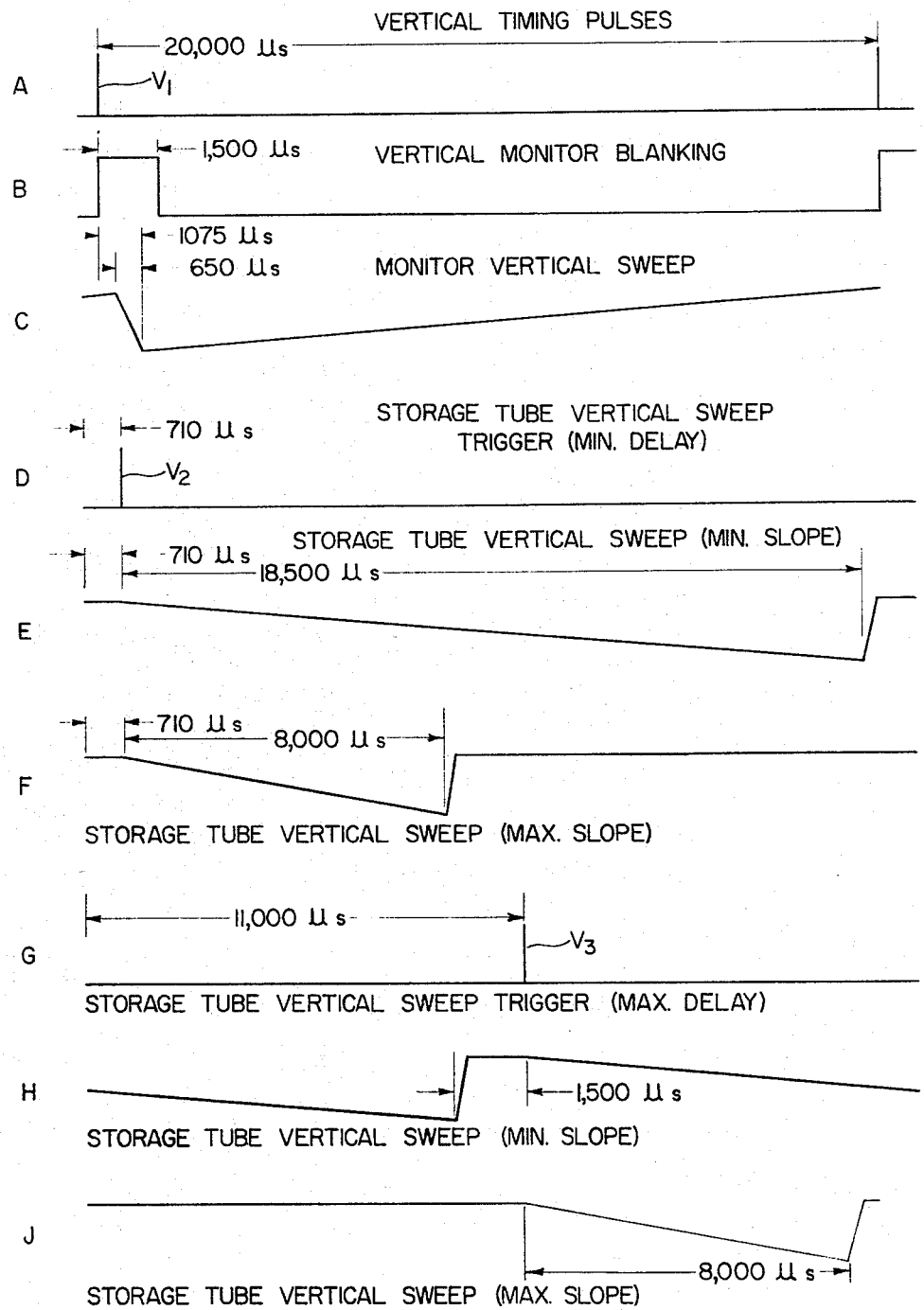
FIG. 4 depicts the time relationship of pulses and waveforms occurring in the vertical sweeps of the arrangement of FIG. 2.

The timing relationship of the vertical sweeps is illustrated by the pulses and waveforms of FIG. 4. Because the vertical timing pulses are periodically emitted by generator 21 at an assumed rate of 50 each second, the period of those pulses is 20,000 $\mu$secs., as indicated in FIG. 4A. The initial vertical timing pulse $V_1$, causes the vertical monitor blanking signal shown in FIG. 4B to be emitted by the blanking amplifier 37 of FIG. 2 and that signal blanks the vertical sweep of the monitor for 1500 $\mu$s. As shown by FIG. 4C, the monitor vertical sweep retrace begins about 425 $\mu$s. after timing pulse $V_1$ and ends about 1075 $\mu$s. after pulse $V_1$ so that the horizontal retrace, which occurs during the vertical blanking interval, requires about 650 $\mu$s. The vertical sweep of the monitor extends over 19,350 $\mu$s., the initial 425 $\mu$s. and the terminal 425 $\mu$s. of which occur during the blanking signals as in FIG. 4B.

Delay generator 22 can cause the transmission of timing pulse $V_1$ to be retarded by a minimum of 710 $\mu$sec. indicated in FIG. 4D, up to a maximum of 11,000 $\mu$secs. as indicated in FIG. 4G. The delayed timing pulse $V_2$ (FIG. 4D) triggers variable slope generator 23 and if that generator is set for minimum slope, it produces the waveform shown in FIG. 4E whereas if that generator is set for maximum slope, the waveform of FIG. 4F is produced. Where the timing pulse encounters the maximum delay, as in FIG. 4G, delayed pulse $V_3$ causes slope generator 23 to furnish the waveform of FIG. 4H where the generator is set for minimum slope, whereas if the generator is set for maximum slope, the waveform of FIG. 4J is generated. The output waveform (FIGS. 4E, 4F, 4H, 4J) of slope generator 23, determines the speed of the vertical sweep in the storage tube, whereas, the monitor vertical sweep (FIG. 4C) is not variable and recurs always at the same speed.

From FIG. 4 it is seen that when vertical delay generator 22 is set for minimum delay and vertical slope generator 23 is set for minimum slope, the waveform of FIG. 4E is generated as the vertical sweep signal for the storage tube. Comparing FIG. 4E with FIG. 4C, it is evident that storage tube vertical sweep (4E) is substantially coextensive and concurrent with the unblanked monitor vertical sweep. Therefore, when the waveform of FIG. 4E is used, the information read out of the storage tube appears over the entire height of the monitor's viewing surface.

During the time that the vertical sweep of the monitor is blanked (see FIG. 4B), information can be written into the storage tube, at other times, information can be read out of the storage tube but not written into it.

The apparatus for writing information into the storage tube may include a number of different devices. For example, any device may be employed which provides signals for positioning the beam of the storage tube at a desired location on the storage surface. For purposes of exposition, two such devices are shown in FIG. 2. One is the digital to analog converter 40. That converter is a conventional device which responds to digitally coded electrical signals, applied at terminals 39, by emitting an electrical signal whose voltage corresponds in value to the digital value of the input signals. The other is the character generator 44. The character generator is a mechanism which responds to input signals applied at terminals 38 by emitting X and Y co-ordinate signals and "write" signals. The X and Y co-ordinate signals are D.C. voltage which cause the beam of the storage tube to be deflected in a chosen pattern and the "write" signals cause the beam's trace to be recorded on the storage surface as a series of dots which form a character, such as the letter A or the numeral 5, for example. The X–Y signals from the character generator are added to the X–Y signals from a pulse shaper 41 which is controlled by converter 40. The combined X signals are impressed on gate 29 whereas the combined Y signals are applied to gate 24. Those gates can pass the X and Y signals only when enabled to do so by a gating signal from write gate generator 43. At all other times, gates 24 and 29 are open to signals from slope generators 23 and 29 and are closed to the X–Y signals.

Each set of information signals applied at input terminals 39 enter the system in the form of binary coded decimals, there being a sub-set of signals for the X co-ordinate and sub-set of signals for the Y co-ordinate. Each set of co-ordinate information signals is accomplished by an information pulse which is impressed at terminal 45 upon information pulse synchronizer 42. The digital to analog converter 40 and pulse shaper 41 cause the input information signals to be converted to analog signals, X and Y, and those signals position the electron beam of the storage tube when the gates 29 and 24 are enabled by a signal from write gate generator 43. When an information pulse is applied at terminal 45 it indicates that information is ready to be written into the storage tube. Timing generator 20 causes pulse synchronizer 42 to emit a trigger to write gate generator 43, causing generator 43 to send out a gating signal beginning coincident with the monitor vertical blanking signal (see FIG. 4B) and having a duration of 1.25 milliseconds. That gating signal causes gates 29 and 24 to switch the storage tube deflection from the sawtooth scanning sweeps provided by slope generators 28 and 23 to the X–Y voltages representing the co-ordinates of the point to be recorded. One millisecond from the beginning of the gating signal, a write pulse or a series of write pulses is emitted by character generator 44. Each write pulse is of two microseconds duration and raises the potential of the storage screen in the storage tube to record the point of the beam. Thus, a character is written on the storage surface or a dot is recorded at the desired co-ordinate position.

After the 1.25 milliseconds of writing time, the signal from write gate generator 43 is gated off and the normal scanning mode controlled by the horizontal and vertical sweep sawtooth generators begins again. During the sawtooth scanning, the information recorded on the storage surface (which is at a slightly higher bias level than that part of the surface which has no information recorded on it) allows a portion of the beam to pass through the mesh of the storage screen to produce a faint video signal at the collector of the tube. The weak video signal is amplified by video amplifier 32 and is employed to intensity modulate the beam in monitor 34. The video output of amplifier 32 is fed to adder 33 and thence to the monitor. The adder is capable of adding one or more outputs from four storage tube channels to give a composite video display on the monitor. Although adder 33 can carry the signals from four channels simultaneously, it provides isolation between individual input signals and the monitor to prevent interchannel interference.

From the foregoing exposition, it is apparent that some combinations of size and variable delay settings can permit part of a storage tube sweep to overlap the beginning of the next monitor sweep. To prevent any display of information scanned in the storage tube during the overlap, the storage tube is blanked so that no signal can be read out of it. Moreover, to prevent the display of spurious signals, the storage tube is blanked whenever the normal vertical or horizontal sawtooth sweep is not present. The blanking is performed by blanking amplifier 37 which receives signals from horizontal generator 28 and vertical generator 23. In order to permit writing to be performed, the blanking amplifier is caused to unblank the storage tube by "write" signals from character generator 44.

THE ADDER

Figure 5:
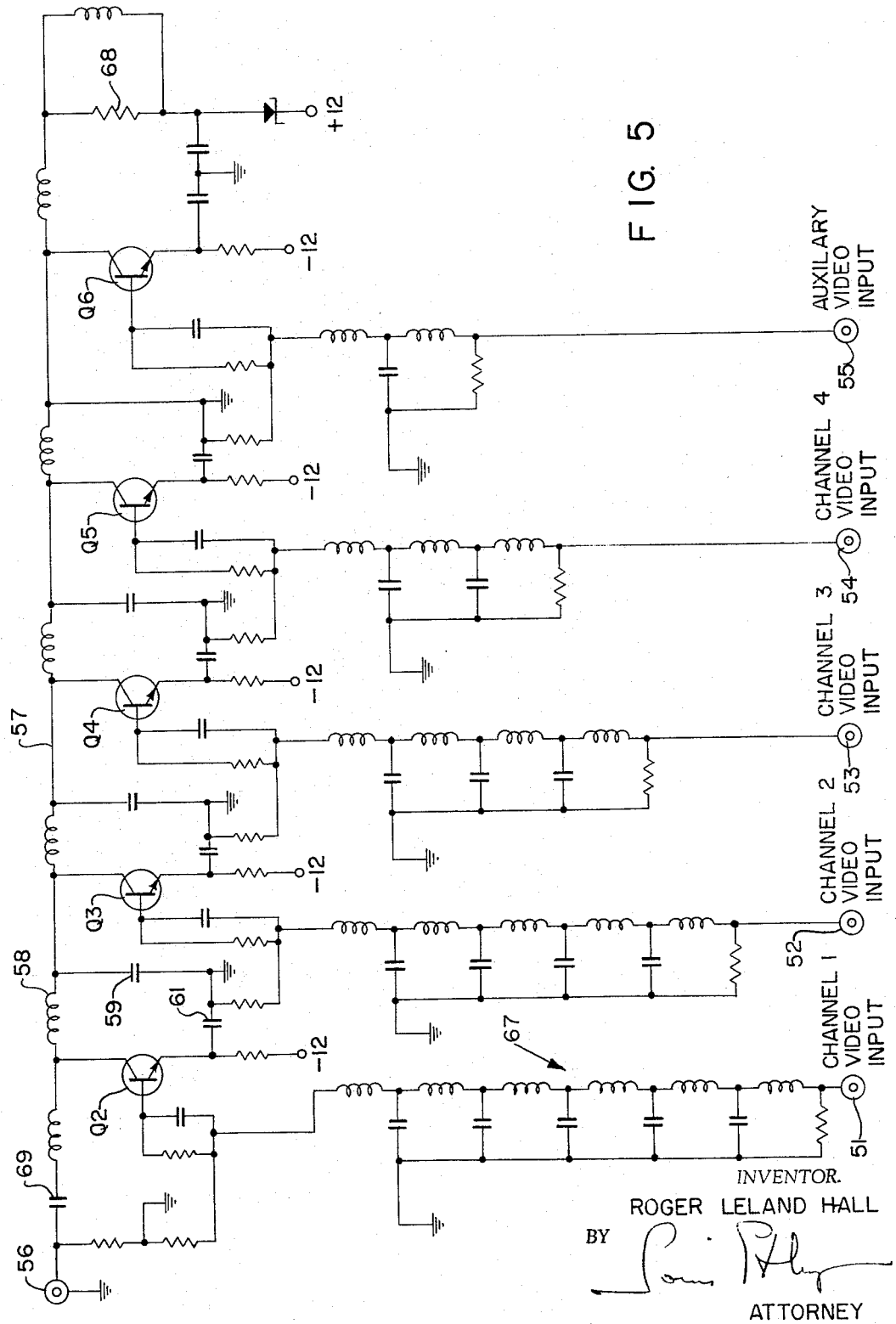
FIG. 5 is a schematic arrangement of an adder device suitable for employment in the invention to perform the functions of the block 33 of FIG. 2.

FIG. 5 schematically depicts a circuit arrangement which can be used as the block designated adder 33 in FIG. 2. The circuit arrangement has five input terminals 51, 52, 53, 54, and 55 and the output is taken at terminal 56. Four different storage tube channels can have their video outputs connected to different ones of the input terminals 51 through 54 and an auxiliary video input is provided at terminal 55 which can be used to display static information, for example. The output line 57 is a lumped constant delay line consisting of constant K low pass filter sections. One such filter section, by way of example, includes the inductor 58, capacitors 59 and 61, and the collector of transistor Q2 acts as part of the capacity of the filter section. The input to the base of each of transistors Q2 through Q6 is one of the video inputs, fed through a number of identical low pass filter sections, such as filter sections 67 so that the overall delay from each input to output connector 56 is identical. The in-phase signals at the video inputs result in in-phase signals in the output line traveling towards output connector 56. Signals traveling in the reverse direction are out-of-phase and those signals are absorbed by terminal resistor 68 and, therefore, never reach the output.

In an embodiment of the apparatus which was constructed, the lumped constant delay line sections were designed to have a high frequency cut-off at 50 megacycles and an impedance of 25 ohms. Those frequency and impedance values were chosen to match the frequency and impedance characteristics of the video amplifiers which supplied the video signals impressed at the input terminals of the adder. The low frequency cut-off of the lumped constant delay line is determined by coupling capacitor 59 and was chosen to be 100 cycles and the gain through any channel was set at unity with a maximum input of one volt r.m.s.

VARIABLE SLOPE GENERATOR

The horizontal and vertical variable slope generators designated by the blocks 28 and 23 of FIG. 2 employ essentially the same circuit except that the time constants are changed to permit the much slower operation of the vertical generator. Since the circuits are essentially the same, only the circuit for the horizontal variable slope generator is described.

Figure 6:
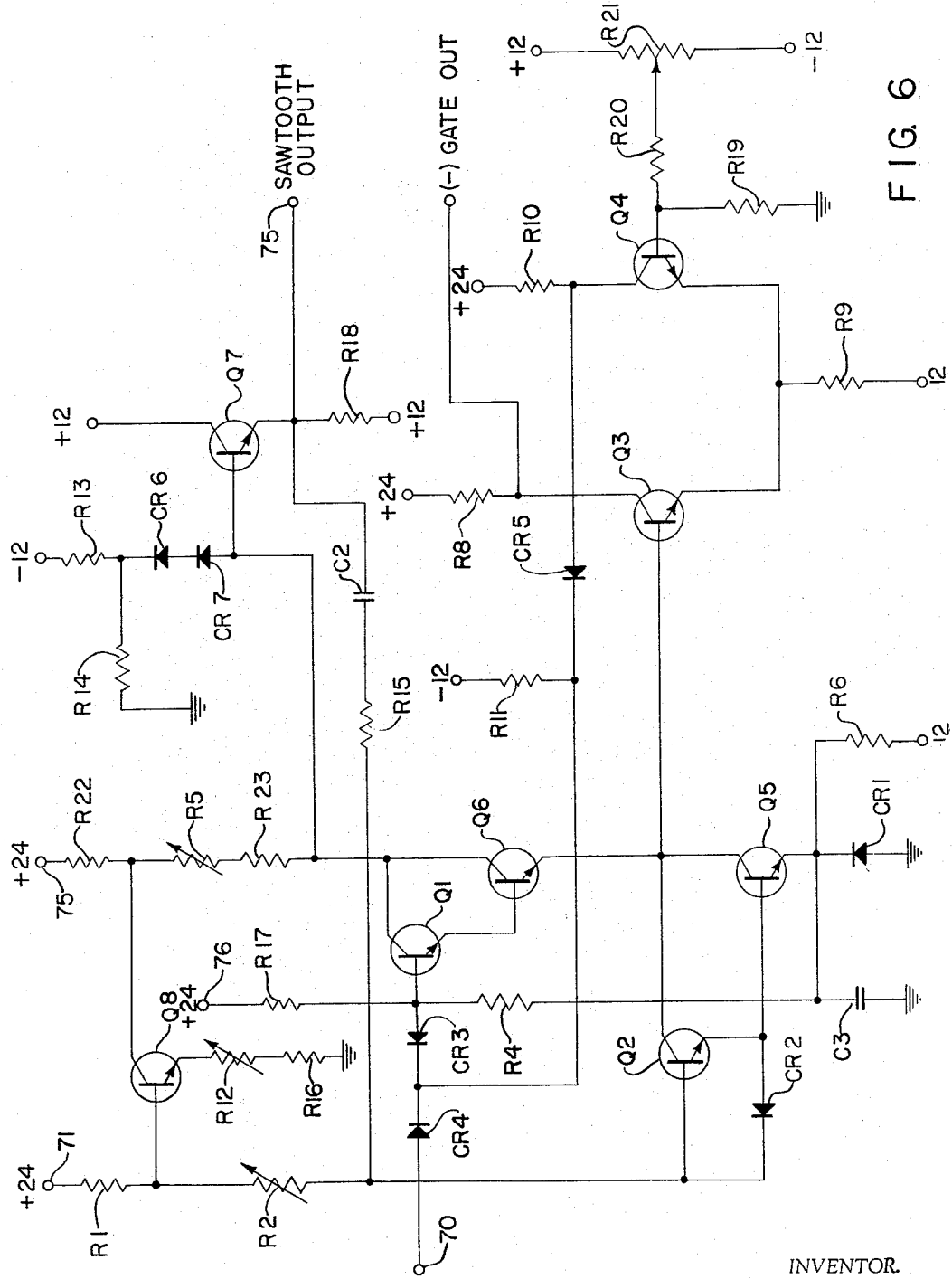
FIG. 6 is a schematic arrangement of a suitable circuit to perform the functions of the block 28 in FIG. 2 representing the horizontal variable slope generator.

FIG. 6 depicts a suitable circuit arrangement for performing the function of the horizontal variable slope generator. The trigger from horizontal variable delay generator 27 (FIG. 2) is impressed at terminal 70 which is the input to a phantastron.

Figure 7:
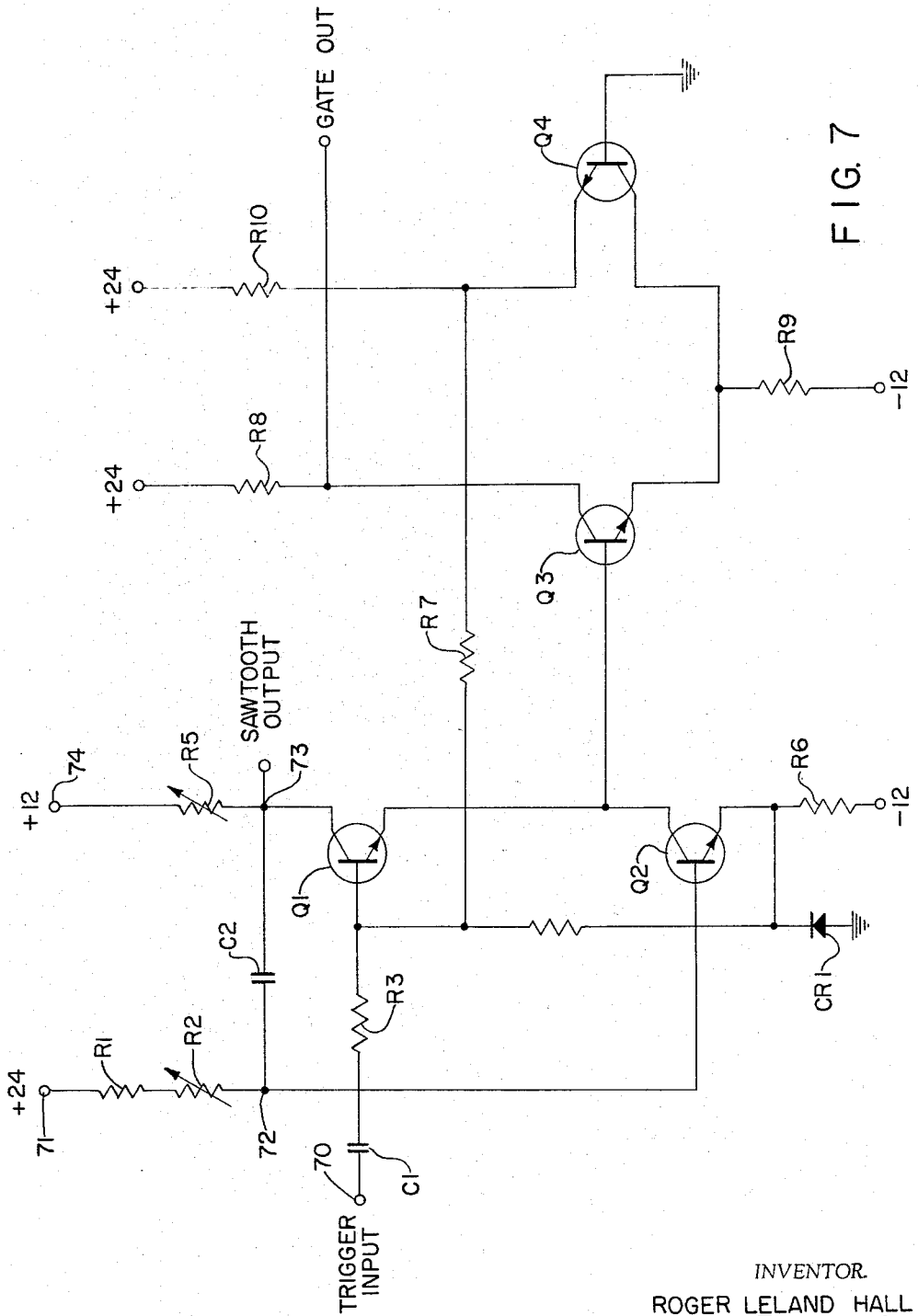
FIG. 7 is a simplified circuit arrangement of the device depicted in FIG. 6 and can be employed as a variable delay generator and as a vertical variable slope generator.

A simplified form of the phantastron is depicted in FIG. 7 for ease of exposition, the phantastron comprising transistors Q1 through Q4 arranged with their circuit components as shown. In the quiescent state, transistor Q1 is cut off: transistor Q2 has its emitter clamped to ground by diode CR1, and its base is returned to the positive potential of +24 volts at terminal 71 through resistors R1 and R2 so that transistor Q2 is in a supersaturated state. The incoming trigger pulse applied at terminal 70 passes through coupling capacitor C1 and causes Q1 to conduct. The resultant signal at the collector of transistor Q1 is coupled through capacitor C2, and drives down the potential at the base of Q2, causing the collector of Q1 to tend to reutrn to its initial potential. Simultaneously, the signal on the emitter of Q1 is amplified by the differential amplifier comprising transistors Q3 and Q4 and the amplified signal is fed back from the emitter of Q4 to the base of Q1, resulting in a regenerative action which holds Q1 in conduction. Capacitor C2 now commences to charge through resistors R1 and R2 and attempts to bring the junction 72 up to the approximate potential of the voltage at terminal 71. The resultant change in potential at the base of Q2 causes the current through that transistor to increase. The result is that the potential at junction 73 is driven down at the same time that the potential at junction 72 rises and at a rate such that the current through R1 and R2 changes linearly. Therefore, a linearly rising sawtooth voltage appears at the collector of Q1. Eventually Q1 reaches saturation so that the impedance of Q1, as seen by transistor Q2, increases sharply, causing a rapid drop in the collector potential of Q2. That drop is amplified by the differential amplifier (Q3 and Q4) and fed back regeneratively to the base of transistor Q1, driving that transistor to cut off and completing a cycle. Capacitor C2 then quickly recharges through resistor R5 from the potential source (+12 volts) at terminal 74. The phantastron thus generates a very linear negative sawtooth at the collector of transistor Q1. The slope of the sawtooth can be varied by changing the value of variable resistor R2 to alter the charging rate of capacitor C2. A substantially rectangular gating signal is available from the collector of transistor Q3.

Turning again to the horizontal variable slope generator shown in FIG. 6, it will be noted that for purposes of comparison with the phantastron of FIG. 7, corresponding circuit components bear the same designation. In the phantastron of FIG. 6, transistor Q6 is connected with transistor Q1, in a configuration known as the "Darlington Compound Connection" to provide additional gain for greater linearity of the generated sawtooth waveform. Similarly transistor Q5 is "Darlington" connected with transistor Q2 for the same purpose. Transistor Q8 has been added to insure that the sawtooth waveform always begins at the same D.C. level. An emitter follower stage, comprising transistor Q7 and resistor R18, is connected to receive its input signal from the collector of Q1 and provides the sawtooth output signal at terminal 75.

The sweep waveform from this phantastron (see FIGS. 4C, D, F, and G) consists of a quiescent D.C. level, a negative going linear ramp, and then a positive going step returning the signal to its quiescent level. It is important that the beginning of the linear ramp start, each time, at the same D.C. level regardless of the setting of variable resistor R2 which controls the slope of the ramp by governing the charging time of capacitor C2. Variable resistor R5 permits setting the D.C. level of the ramp to the desired value. The D.C. level of the bottom of the ramp is controlled by the setting of potentiometer R21 which varies the balance of the differential amplifier formed by transistors Q3 and Q4 and their associated components.

To provide temperature compensation for the circuit components a pair of diodes CR5 and CR6, of a type designated IN457, are provided in the emitter follower stage.

Because of the high frequency of operation of the horizontal variable slope sweep generator, diode gating using diodes CR3, CR4 and CR5 is required. In the quiescent state diode CR3 normally conducts, holding Q1 cut off. When either a trigger signal at terminal 70 or the regenerative signal from the collector of Q4 passes through diodes CR4 or CR5, respectively, it cuts off diode CR3 and a constant current from terminal 76 is applied to the base of Q1 through resistor R17. This prevents an excess of current from being applied to the base of Q1 as might occur if the trigger signal and the regenerative signal appeared simultaneously and were applied directly to the transistor's base. At the low frequencies at which the vertical variable slope generator operates such an effect does not occur, but at the operational frequency of the horizontal sweep generator, this effect if uncorrected produces a distinct discontinuity in the sweep.

From FIG. 2, it can be observed that horizontal slope generator 28 and vertical slope generator 23 each provide a signal to blanking amplifier 37. The purpose of those signals is to cause the blanking amplifier to blank the storage tube and the monitor whenever generators 28 and 23 are not furnishing sawtooth sweep signals. The blanking signals from the horizontal variable slope generator is obtained from the collector of transistor Q3 as indicated in FIG. 6 by the terminal designated (—) Gate Out. A negative going gating signal is generated at the collector of transistor Q3 during the time the negative going ramp of the sawtooth is absent at terminal 75. Where a positive going gating signal is required, it can be obtained from the collector of transistor Q4.

VARIABLE DELAY GENERATOR

Horizontal variable delay generator 27 and vertical variable delay generator 22 can be trigger circuits of the multivibrator type such as is described in the book Pulse and Digital Circuits, 1st ed., by Millman and Taub, published by McGraw-Hill or may be phantastrons of the type described in that book on page 223. It is interesting to note that the circuits depicted in FIGS. 6 and 7 can also be used as variable delay generators. The gating signals obtained from the collectors of Q3 and Q4 are pulses which occur at the end of the negative going sawtooth ramp. The duration of the sawtooth ramp is varied by setting variable resistor R2 and therefore the occurrence of the gating pulses can be adjusted to provide the desired delay, Where necessary, the output gating pulses from Q3 and Q4 can be differentiated to obtain "spike" triggers.

INFORMATION PULSE SYNCHRONIZER

Figure 8:
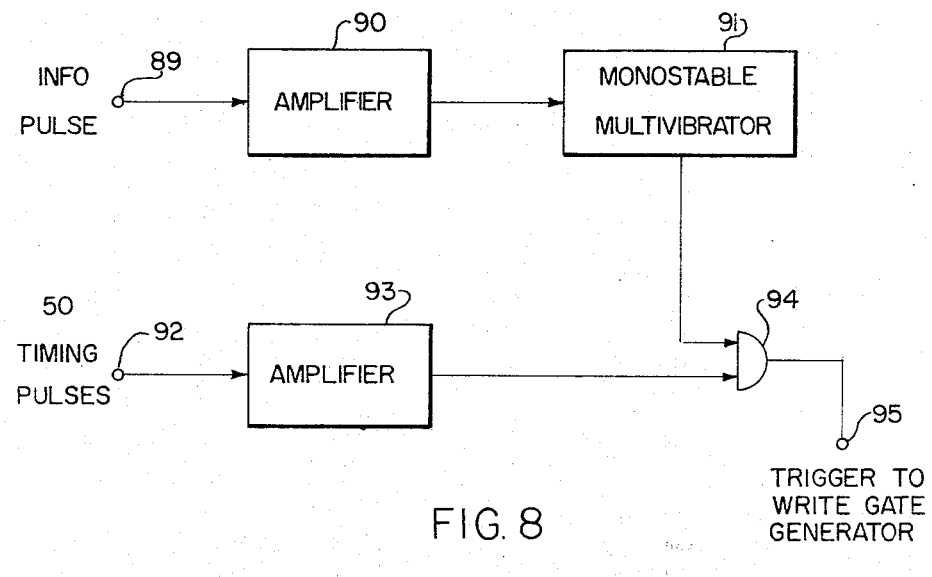
FIG. 8 shows a diagram of the internal arrangement of the block designated information pulse synchronizer in FIG. 2.

Information pulses impressed at terminal 45 (FIG. 2) arrive at random times. The arrival of an information pulse indicates that new information is to be written on the storage tube at the next available "writing" interval. To avoid interrupting the display of information already recorded in the storage tube, the new information is written into the storage tube during the vertical retrace of the monitor. Information pulse synchronizer 42 accomplishes that operation by producing "write" triggers coincident with the monitor vertical retrace which follows an information pulse. In the synchronizer shown schematically in FIG. 8, the information pulse at terminal 89 is amplified in amplifier 90 and triggers a monostable multivibrator 91. The multivibrator produces a gate of somewhat greater than 20 milliseconds duration, thus insuring that at least one 50 cycle timing pulse from generator 20 will occur during the gating interval. The 50 cycle timing pulses are coincident with the beginning of the monitor's vertical retrace. The 50 cycle timing pulse is impressed at terminal 92 and is applied through a pulse shaping amplifier 93 to a gating mechanism 94 which is enabled by the 20 millisecond gate signal from the monostable multivibrator 91. Gate 94 may be a conventional coincidence gate which permits the output from amplifier 93 to pass through it whenever both of its inputs are energized by appropriate signals. The trigger pulse passing through gate 94 appears at terminal 95 which is connected to the input of write gate generator 43 (FIG. 2).

WRITE GATE GENERATOR

Write gate generator 43, when triggered, produces a 1.25 millisecond gating signal which is applied, as shown in FIG. 2, to gates 24 and 29. The 1.25 millisecond signal causes those gates to permit the X-Y signals to pass to horizontal and vertical amplifiers 30, 25 while preventing passage of the sawtooth signals from generators 28 and 23. The write gate generator also produces a one millisecond gating signal whose beginning is coincident with 1.25 millisecond gating signal and whose trailing edge initiates the writing action after a sufficient delay from switching from sawtooth sweeps to X-Y deflection to permit the deflection yokes of the storage tube to settle down.

Figure 9:
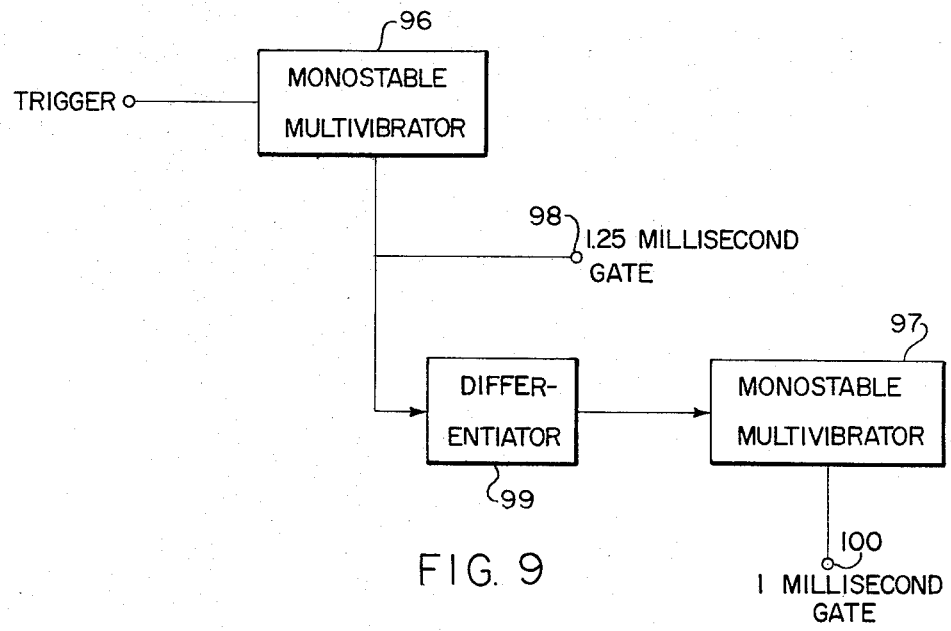
FIG. 9 depicts in diagrammatic form, the internal arrangement of the block labelled write gate generator in FIG. 2.

An indicated in FIG. 2, the trigger signal from information pulse synchronizer 42 is applied to the input of write gate generator 43. The block diagram of FIG. 9 represents write gate generator 43. That generator is essentially comprised by a pair of monostable multivibrators 96 and 97. The triggering signal from information pulse synchronizer 42 is impressed on the input of multivibrator 96 and causes that device to emit the 1.25 millisecond gating signal at terminal 98. The leading edge of the gating signal is differentiated by differentiator 99 to obtain a voltage "spike" which triggers the monostable multivibrator 97. Upon being triggered, multivibrator 97 emits a one millisecond gating signal at terminal 100. The trailing edge of the one millisecond gating signal is employed to trigger character generator 44, whereupon the character generator may produce a series of write pulses for recording information in the storage tube.

It is evident from the foregoing description of the invention that information from the different channels may be displayed in overlapping relation on the monitor for purposes of correlation or the information from each channel may be caused to occupy a different portion of the monitor where it is desired to view the information from each channel separately. One of a combination of different channels can be selected for the display of information on the monitor while information is retained in the unselected storage channels. Where one signal channel becomes defective or inoperative, the system can continue to operate by employing the other signal channels while the defective channel is repaired.

While the fundamental novel features of the invention are shown and described as embodied in preferred apparatus, it should be understood that changes in the form and details of the illustrated devices can be made without departing from the essence of the invention, and indeed are obvious to those skilled in the electronics art. It is intended, therefore, that the scope of the invention be construed in accordance with the appended claims.

What is claimed is:
1. An electronic display system comprising:
   a monitor tube of the type employing an electron beam to write information on a display surface to thereby serve as a display tube;
   means for causing the electron beam of the display tube to cyclically scan the display surface in a predetermined pattern;
   a storage tube of the type having a storage surface adapted to be scanned by an electron beam;
   means for cyclically causing the electron beam to scan the storage surface in the predetermined pattern to provide readout signals indicative of information recorded on the storage surface;
   means for applying the readout signals of the storage tube to the display tube to cause the information to be displayed;

timing means for causing the electron beams of the storage and display tubes to scan the predetermined pattern in synchronism;

and means for causing new information to be written on the storage tube only during the retrace period of the display tube.

2. An electronic display system according to claim 1, further comprising:

means for delaying initiation of the beam sweep in the storage tube;

and means for varying the sweep rate of the beam in the storage tube.

3. An electronic display system according to claim 2, further comprising:

means, operative when information is to be written, for positioning the storage tube's beam in a selected location on the storage surface;

and a character generator for providing signals to cause a selected character to be written on the storage surface.

4. An electronic display system according to claim 3 in which each information storage channel further comprises:

means for delaying initiation of the sweep of the beam in the storage tube, and means for varying the sweep rate of the beam in the storage tube.

5. An electronic display system according to claim 4 further comprising:

a character generator for providing signals during the writing period to cause characters to be written into the storage tube of a storage channel;

and means for causing information to be written at a selected location on the storage surface of the storage tube in a storage channel.

6. An electronic display system comprising:

a storage tube of a type having a storage surface adapted to be scanned by an electron beam;

means for cyclically causing the electron beam to scan the storage surface to provide readout signals indicative of the information stored on the storage surface;

a display tube of the type having an electron beam and a surface for displaying information;

means for causing the electron beam of the display tube to cyclically scan the display surface;

means for causing the readout signal of the storage tube to be applied to the display tube;

means for causing the electron beam of the storage and display tube to scan in synchronism;

means for causing information to be written on the storage tube during the retrace period of the display tube;

the last named means including means for positioning the writing beam in a desired position on the storage surface;

means for delaying the sweep of the beam in the storage tube;

and means for causing the beam in the storage tube to scan at a rate of speed maintaining line-by-line synchronism with the scanning of the display tube.

7. An electronic display system comprising:

a display tube of the type having an electron beam and a surface for displaying information;

means for causing the electron beam of the display tube to cyclically scan the display surface;

a plurality of information storage channels, each information storage channel comprising:

(a) a storage tube of the type having a storage surface scanned by an electron beam, (b) means for cyclically causing the electron beam to provide readout signals indicative of the information recorded on the storage surface, timing means for causing the electron beam of the storage tube in each information storage channel, when reading out information, to scan in synchronism with the electron beam scan in the display tube;

adder means for causing the information signals from each storage channel to be applied to the display tube;

and means for causing new information to be recorded in the storage tube of any storage channel whose information is being displayed by permitting writing of the new information only during the retrace period of the display tube;

and means for adding video signals from any other source which may be synchronized by the basic timing generator.

References Cited by the Examiner

UNITED STATES PATENTS

| 2,753,552 | 7/1956 | Hom | 343—11 |
| 3,061,670 | 10/1962 | Oster | 178—6.8 |
| 3,090,829 | 5/1963 | Lee et al. | 178—6.8 |

DAVID G. REDINBAUGH, *Primary Examiner.*

R. L. RICHARDSON, *Assistant Examiner.*